United States Patent
Tsubota et al.

(10) Patent No.: US 10,728,508 B2
(45) Date of Patent: Jul. 28, 2020

(54) PROJECTION SYSTEM AND PROJECTION METHOD

(71) Applicant: Panasonic Intellectual Property Management Co., Ltd., Osaka (JP)

(72) Inventors: Chiharu Tsubota, Osaka (JP); Kazuhiro Minami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/534,189

(22) Filed: Aug. 7, 2019

(65) Prior Publication Data
US 2019/0364251 A1     Nov. 28, 2019

Related U.S. Application Data

(63) Continuation of application No. PCT/JP2017/027827, filed on Aug. 1, 2017.

(30) Foreign Application Priority Data

Mar. 24, 2017 (JP) .................................. 2017-058444

(51) Int. Cl.
*G03B 21/60* (2014.01)
*G03B 21/604* (2014.01)
(Continued)

(52) U.S. Cl.
CPC ....... *H04N 9/3147* (2013.01); *G03B 21/2033* (2013.01); *G03B 21/2073* (2013.01);
(Continued)

(58) Field of Classification Search
CPC ...... G03B 21/604; G03B 21/60; G03B 21/26; G03B 21/147; G03B 21/006; G03B 21/008
(Continued)

(56) References Cited

U.S. PATENT DOCUMENTS 6,512,507 B1    1/2003  Furihata et al.
9,774,832 B1*   9/2017  Minami ............... H04N 9/3155
(Continued)

FOREIGN PATENT DOCUMENTS

JP    11-345087     12/1999
JP    3496871       2/2004
(Continued)

OTHER PUBLICATIONS

International Search Report dated Oct. 24, 2017 in International (PCT) Application No. PCT/JP2017/027827.

*Primary Examiner* — Ryan D Howard
(74) *Attorney, Agent, or Firm* — Wenderoth, Lind & Ponack, L.L.P.

(57) ABSTRACT

A projection system projects an image corresponding to a shape of an object. The projection system includes a non-visible light projection unit, an imager, an image generation unit, and a visible-light projection unit. The non-visible light projection unit projects a predetermined non-visible light image with non-visible light having predetermined polarized light as a main component, onto the object and a background member that reflects the non-visible light while the background member maintains the predetermined polarized light. The imager images a non-visible light image reflected by the object and the background member while blocking the non-visible light of the predetermined polarized light, and generates imaged data. The image generation unit measures the shape of the object based on the imaged data, and generates image data according to a measurement result. The visible-light projection unit projects an image shown by the image data, onto the object with visible light.

18 Claims, 6 Drawing Sheets

(51) Int. Cl.
  *H04N 9/31* (2006.01)
  *H04N 13/312* (2018.01)
  *G03B 21/20* (2006.01)

(52) U.S. Cl.
  CPC .......... *G03B 21/60* (2013.01); *H04N 9/3167* (2013.01); *H04N 13/312* (2018.05)

(58) Field of Classification Search
  USPC .......................................................... 353/28
  See application file for complete search history.

(56) References Cited

U.S. PATENT DOCUMENTS

| | | |
|---|---|---|
| 2016/0088275 A1 | 3/2016 | Fuchikami |
| 2017/0208305 A1 | 7/2017 | Kaneda et al. |

FOREIGN PATENT DOCUMENTS

| | | |
|---|---|---|
| JP | 2015-173431 | 10/2015 |
| WO | 2016/017296 | 2/2016 |

\* cited by examiner

PROJECTION SYSTEM AND PROJECTION METHOD

BACKGROUND

1. Technical Field

The present disclosure relates to a projection system and a projection method for projecting an image according to a shape, a position, and the like of an object.

2. Description of the Related Art

Patent literature (PTL) 1 discloses a projection system for projection mapping to project an image content onto a structure such as a building. In the projection system of PTL 1, a projection apparatus illuminates a structure with image light showing an image content and pattern light showing a pattern image in which projection coordinates defined by a projection coordinate system are coded. Further, the imaging apparatus captures a pattern image projected on the structure. According to the projection system of PTL 1, it is possible to perform projection mapping by matching a position of the image content to the structure.

Here, PTL 1 is Unexamined Japanese Patent Publication No. 2015-173431.

SUMMARY

The present disclosure provides a projection system and a projection method capable of, in a projection system of projecting an image according to a shape of an object, measuring the shape of the object with high accuracy.

A projection system of the present disclosure is a projection system for projecting an image corresponding to a shape of an object. The projection system includes a non-visible light projection unit, an imager, an image generation unit, and a visible-light projection unit. The non-visible light projection unit projects a predetermined non-visible light image with non-visible light having predetermined polarized light as a main component, onto the object and a background member that reflects the non-visible light while the background member maintains the predetermined polarized light. The imager images a non-visible light image reflected by the object and the background member while blocking the non-visible light of the predetermined polarized light, and generates imaged data from the non-visible light image. The image generation unit measures the shape of the object based on the imaged data, and generates image data according to a measurement result. The visible-light projection unit projects an image shown by the image data, onto the object with visible light.

Further, a projection method according to the present disclosure is a projection method for projecting an image corresponding to a shape of an object. The projection method includes a non-visible light projection step, an imaging step, an image generation step, and a visible-light projection step. In the non-visible light projection step, a predetermined non-visible light image with non-visible light having predetermined polarized light as a main component is projected onto the object and a background member that reflects the non-visible light while the background member maintains the predetermined polarized light. In the imaging step, a non-visible light image reflected by the object and the background member is imaged with the non-visible light of the predetermined polarized light being blocked, and imaged data is generated from the non-visible light image. In the image generation step, the shape of the object is measured based on the imaged data, and image data is generated according to a measurement result. In the visible-light projecting step, an image shown by the image data is projected onto the object with visible light.

According to the projection system or the projection method according to the present disclosure, in a projection system for projecting an image according to a shape of an object, the shape of the object can be measured with high accuracy.

DETAILED DESCRIPTION

Exemplary embodiments will be described in detail below with reference to the drawings as appropriate. However, a detained description more than necessary may be omitted. For example, a detailed description of a well-known matter and a duplicated description of substantially the same configuration may be omitted. This is to avoid unnecessary redundancy in the description below and to make the description easily understandable to those skilled in the art.

The applicant of the present disclosure provides the appended drawings and the following description in order to allow those skilled in the art to fully understand the present disclosure, and does not intend to limit the subject matter described in the appended claims by the appended drawings and the following description.

First Exemplary Embodiment

1. Configuration

Figure 1:
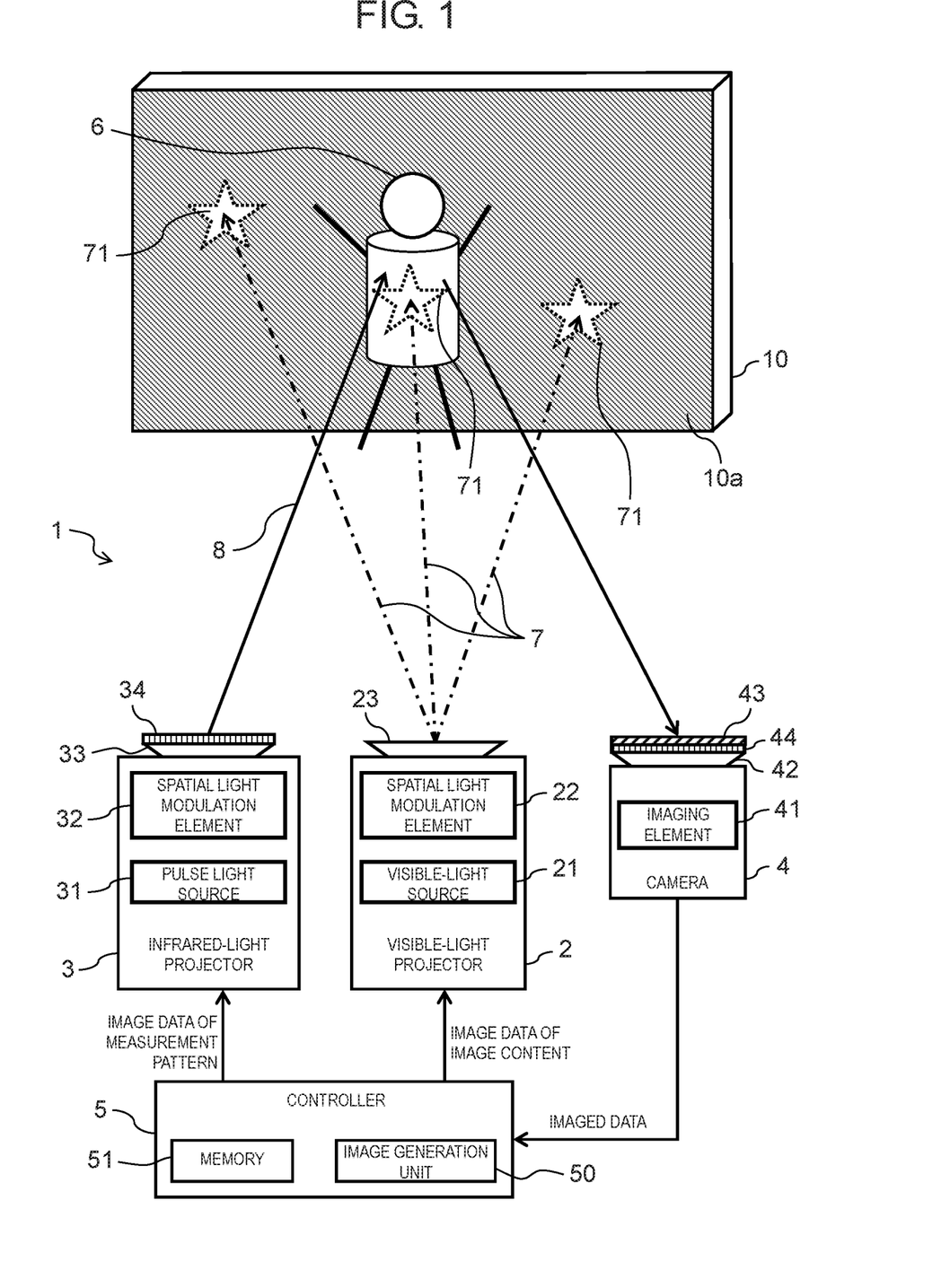
FIG. 1 is a block diagram illustrating a configuration of a projection system according to a first exemplary embodiment.

A configuration of a projection system according to a first exemplary embodiment will be described with reference to FIG. 1. FIG. 1 is a block diagram illustrating a configuration of projection system 1 according to the first exemplary embodiment.

As illustrated in FIG. 1, projection system 1 includes visible-light projector 2, infrared-light projector 3, camera 4, and controller 5. Projection system 1 according to the present exemplary embodiment is a system for performing projection mapping to project an image of visible light 7 onto subject 6 such as a human being for stage effects, for example. In projection system 1, in order to allow image content 71 by visible light 7 from visible-light projector 2 to follow movement of subject 6, a shape and the like of subject 6 is measured with use of infrared-light projector 3 and camera 4. Further, screen 10 is disposed at a position behind subject 6 in a projection direction of each projector 2, 3.

Visible-light projector 2 is a projector of a Digital Light Processing (DLP) system, a 3 liquid crystal display (3LCD) system, a Liquid Cristal on Silicon (LCOS) system, or the like. Visible-light projector 2 emits visible light 7 so as to project an image containing various image contents 71, based on an image signal (image data) input from controller 5, for example. Visible-light projector 2 is an example of a visible-light projection unit in the present exemplary embodiment. As illustrated in FIG. 1, visible-light projector 2 includes visible-light source 21, spatial light modulator 22, and projection optical system 23.

In the present exemplary embodiment, visible-light source 21 includes a plurality of light source elements (for example, light-emitting diodes (LEDs)) that emit red light, green light, and blue light, respectively. Visible-light source 21 may have only a light source element of a single color or a light source element of white color as appropriate, according to a projection system of visible-light projector 2. The light source element may be a laser diode or a halogen lamp.

In the present exemplary embodiment, spatial light modulator 22 is configured of three spatial light modulation elements. As the spatial light modulation element, a digital micro-mirror device (DMD), a liquid crystal display (LCD), or the like may be used. Spatial light modulator 22 may be configured of one spatial light modulation element.

Projection optical system 23 includes a zoom lens for setting an angle of view of visible-light projector 2, and a focus lens for adjusting focus.

Infrared-light projector 3 is a projector of a Digital Light Processing (DLP) system, a liquid crystal display (LCD) system, a Liquid Cristal on Silicon (LCOS) system, or the like. Infrared-light projector 3 projects a predetermined measurement pattern of infrared light 8 described below, based on an image signal (image data) input from controller 5, for example. Infrared-light projector 3 is an example of a nonvisible-light projection unit that projects a nonvisible-light image by nonvisible light. While infrared light is used as an example of nonvisible light in the present exemplary embodiment, it is not limited thereto.

Ultraviolet light may be used, for example.

As illustrated in FIG. 1, infrared-light projector 3 includes pulse light source 31, spatial light modulation element 32, projection optical system 33, and first polarizing filter 34.

In the present exemplary embodiment, pulse light source 31 is configured with a pulse laser that pulse-oscillates infrared light. Pulse light source 31 emits pulses of infrared light having a peak wavelength ranging from 800 nm to 900 nm, in a pulse width ranging from 0.1 picoseconds to 20 microseconds, by pulse oscillation.

Spatial light modulation element 32 is configured with a DMD, a LCD, or the like. On an image formation surface of spatial light modulation element 32, an image is formed based on an image signal from controller 5 or the like. When the infrared light emitted as pulses in pulse light source 31 is made incident on the image formation surface of spatial light modulation element 32, the infrared light is spatially modulated, whereby a nonvisible light image is generated.

Projection optical system 33 includes a zoom lens for setting an angle of view of infrared-light projector 3, and a focus lens for adjusting focus.

First polarizing filter 34 is a polarizing filter that transmits only a linearly polarized light component in a particular direction out of the nonvisible light projected from infrared-light projector 3. First polarizing filter 34 is attached to projection optical system 33, for example. First polarizing filter 34 is an example of a polarizing member that applies a particular polarization property to nonvisible light in infrared-light projector 3. First polarizing filter 34 may be disposed in projection optical system 33 between pulse light source 31 and screen 10, or may be incorporated in and integrated with projection optical system 33.

Projectors 2, 3 are disposed so as to be able to emit light to an identical area, for example. Projectors 2, 3 may be optically linked such that respective optical axes match. In that case, it is possible to use a dichroic mirror that transmits visible light and reflects infrared light, or reflects visible light and transmits infrared light, for example. In that case, projection optical systems 23, 33 may be configured integrally. Further, infrared-light projector 3 and visible-light projector 2 may be configured integrally as one apparatus.

Camera 4 is disposed at a position where it is able to capture an image of an area to which a nonvisible light image is projected by infrared-light projector 3. Camera 4 captures an image of a measurement pattern projected onto subject 6 by infrared light 8, generates imaged data that is image data showing the captured image, and output it to controller 5. Camera 4 is an example of an imager in projection system 1. As illustrated in FIG. 1, camera 4 includes imaging device 41, imaging lens 42, visible-light cutoff filter 43, and second polarizing filter 44.

Imaging device 41 is configured with a solid-state imaging device such as a charge-coupled device (CCD) image sensor or a complementary metal oxide semiconductor (CMOS) image sensor containing silicon as a main material, for example. Imaging device 41 has an imaging surface in which a plurality of pixel circuits that receive light are aligned. The main material of imaging device 41 is not limited to silicon. It may be germanium or gallium.

Imaging lens 42 includes a zoom lens for setting an angle of view of camera 4, and a focus lens for adjusting focus.

Visible-light cutoff filter 43 is a bandpass filter or a long pass filter that transmits infrared light component of incident light and absorbs visible light component. Visible-light cutoff filter 43 is attached to imaging lens 42, for example. Visible-light cutoff filter 43 is an example of a wavelength selecting member that selectively transmits infrared light in camera 4.

Visible-light cutoff filter 43 may be integrally formed with imaging lens 42 by coating on imaging lens 42, formation of a diffraction grating, or the like. Visible-light cutoff filter 43 may be configured by being incorporated in an image formation surface or the like of imaging device 41. Instead of or in addition to absorbing visible-light component, visible-light cutoff filter 43 may be configured to reflect visible-light component.

Second polarizing filter 44 is a polarizing filter that transmits only linearly polarized light component in a particular direction out of light made incident on camera 4. Since second polarizing filter 44 blocks infrared light having a particular infrared light property applied by first polarizing filter 34, second polarizing filter is installed so as to have a property of an orientation different from a property of first polarizing filter 34 by 90°. Second polarizing filter 44 is attached to imaging lens 42, for example. Second polarizing filter 44 is an example of a polarizing member that blocks nonvisible light having a particular polarization property in camera 4. Second polarizing filter 44 may be disposed on imaging lens 42 between imaging device 41 and screen 10, or may be integrally formed with imaging lens 42. Alternatively, second polarizing filter 44 may be configured by being incorporated in an image formation surface of imaging device 41. Alternatively, second polarizing filter 44 may be integrally formed with visible-light cutoff filter 43.

Controller 5 is a control device that controls respective units of projection system 1. Controller 5 includes a central processing unit (CPU) or a micro-processing unit (MPU) that implements predetermined functions in cooperation with software, for example. As illustrated in FIG. 1, controller 5 includes image generation unit 50 and memory 51.

Controller 5 reads data and programs stored in memory 51 to perform various types of arithmetic processing to implement various functions. For example, controller 5 implements a function as image generation unit 50. Controller 5 may also perform control of various types of operation timing such as camera 4, infrared-light projector 3, and visible-light projector 2 (for example, synchronization control of respective units), zoom control, focus control, and the like.

Controller 5 may be a hardware circuit such as a dedicated electronic circuit designed to implement a predetermined function or a reconfigurable electronic circuit. Controller 5 may be configured with various semiconductor integrated circuits such as a CPU, a MPU, a microcomputer, a digital signal processor (DSP), a field programmable gate array (FPGA), and an application specific integrated circuit (ASIC). Further, various functions of controller 5 may be incorporated in visible-light projector 2, infrared-light projector 3, and camera 4.

Image generation unit 50 generates image data showing image content 71 projected by visible-light projector 2. At that time, the image data is needed to be generated such that image content 71 can be projected following movement of subject 6. Therefore, image generation unit 50 performs three-dimensional measurement of the shape and the like of subject 6 based on imaged data from camera 4. Operation of image generation unit 50 will be described below.

Memory 51 is a storage medium that stores a program and data required for implementing the function of controller 5, and includes a hard disk drive (HDD) or a solid state drive (SSD). Memory 51 may also include a semiconductor device such as a dynamic random-access memory (DRAM), a static random-access memory (SRAM), or the like. Memory 51 temporarily stores data and also functions as a work area of controller 5. For example, memory 51 stores image data showing various image contents 71 and image data showing a measurement pattern to be described below.

Screen 10 is an example of a background member for projecting image content 71 serving as a background of subject 6 in projection system 1. With use of screen 10, image content 71 in conjunction with movement of subject 6 is projected, for example. This can enhance stage effects in projection mapping. Screen 10 also includes reflection surface 10a (projection surface) on a side to which infrared light 8 is projected (a side to which image content 71 is projected), as illustrated in FIG. 1. Reflection surface 10a has a characteristic of maintaining a polarization property of infrared light 8. Reflection surface 10a may be a flat surface or a curved surface if it has a nature of maintaining a polarizing property. As screen 10, a screen on which metal powder is applied all over reflection surface 10a (for example, silver screen) can be used. Such screen 10 can be obtained by coating a base material of the screen with spray containing metal powder such as aluminum particles or silver particles.

2. Operation

Operation of projection system 1 configured as described above will be described below.

2-1. Projection Operation (Projection Mapping)

A projection operation for performing projection mapping in projection system 1 according to the present exemplary embodiment will be described with reference to FIG. 1.

First, infrared-light projector 3 emits infrared light 8 and sequentially projects measurement patterns out of a plurality of measurement patterns onto subject 6. The measurement patterns of infrared light 8 are examples of nonvisible light images for measuring a shape and a position of subject 6 by means of a spatial coding method. The shape of a measurement target is a three-dimensional shape including a contour and irregularities of an object such as subject 6. Further, the position of the measurement target is a three-dimensional position including a distance up to an object. A principle of three-dimensional measurement will be described below.

Infrared-light projector 3 reads image data stored in memory 51 through control by controller 5, for example, and forms a measurement pattern shown by image data in spatial light modulation element 32. Then, infrared-light projector 3 drives pulse light source 31 to project a measurement pattern of infrared light 8 in an angle of view including a range of an entire projection surface of screen 10.

At that time, camera 4 captures the measurement pattern projected by infrared-light projector 3, and outputs imaged data showing a captured image of the measurement pattern to controller 5. Imaging operation by camera 4 is performed for each measurement pattern of the plurality of measurement patterns.

Next, image generation unit 50 of controller 5 measures the shape and the position of subject 6 based on the imaged data of the measurement pattern, and generates image data showing image content 71 to be projected onto subject 6 according to a measurement result.

Specifically, image generation unit 50 measures a distance to an own device for each pixel in an area of subject 6 in the imaged data by the spatial coding method to be describe below, and generates a distance image showing the distance measured for each pixel. Based on the generated distance image, image generation unit 50 corrects default image data such that image content 71 shown by the default image data is displayed properly when it is projected onto subject 6 of the shape and the position both of which are measured. The default image data is previously stored in memory 51, for example.

Further, in the present exemplary embodiment, image generation unit 50 generates image data to be output to visible-light projector 2 so as to include image content 71 to be projected onto screen 10. For example, through calibration at the time of installing projection system 1 or the like, information about the position and the shape (orientation) of screen 10 is previously recorded on memory 51, and at the time of projection operation, image generation unit 50 refers to the information to correct image content 71 to be projected onto screen 10.

Next, visible-light projector 2 controls spatial light modulator 22 based on image data from image generation unit 50 of controller 5, and projects image content 71 onto subject 6 and screen 10 through emission of visible light 7 from visible-light source 21.

Projection system 1 repeatedly performs the processing described above at a predetermined frame rate. Thereby, it is possible to cause image content 71 projected from visible-light projector 2 to follow the movement of subject 6 with high accuracy.

In the projection operation of projection system 1 as described above, it is important to improve measurement accuracy of the shape and the position of subject 6 based on the captured image of the measurement pattern projected from infrared-light projector 3. Therefore, in order to achieve the object of improving the measurement accuracy, the present exemplary embodiment uses first polarizing filter 34, screen 10, second polarizing filter 44, and visible-light cutoff filter 43. Further, in order to achieve the object, the present exemplary embodiment employs pulse emission control in infrared-light projector 3. Details of the operation of projection system 1 according to the present exemplary embodiment will be described below.

2-2. Principle of Three-Dimensional Measurement

Figure 2:
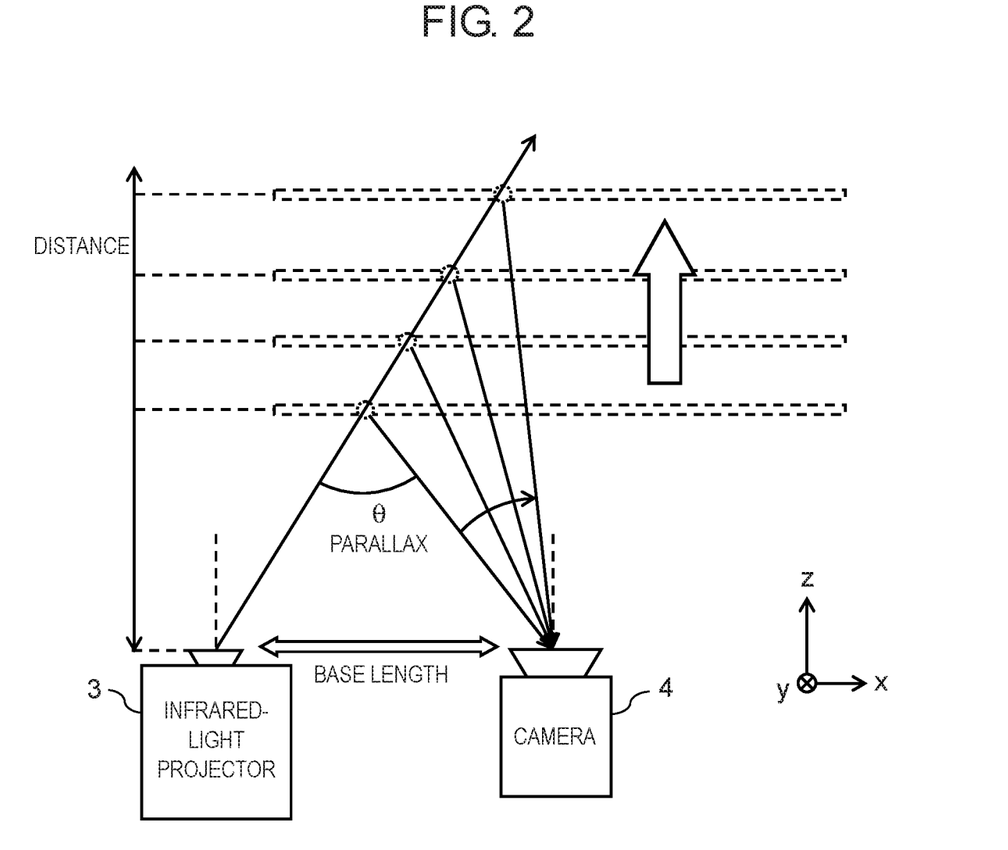
FIG. 2 is a diagram for explaining a principle of three-dimensional measurement in a projection system.
Figure 3:
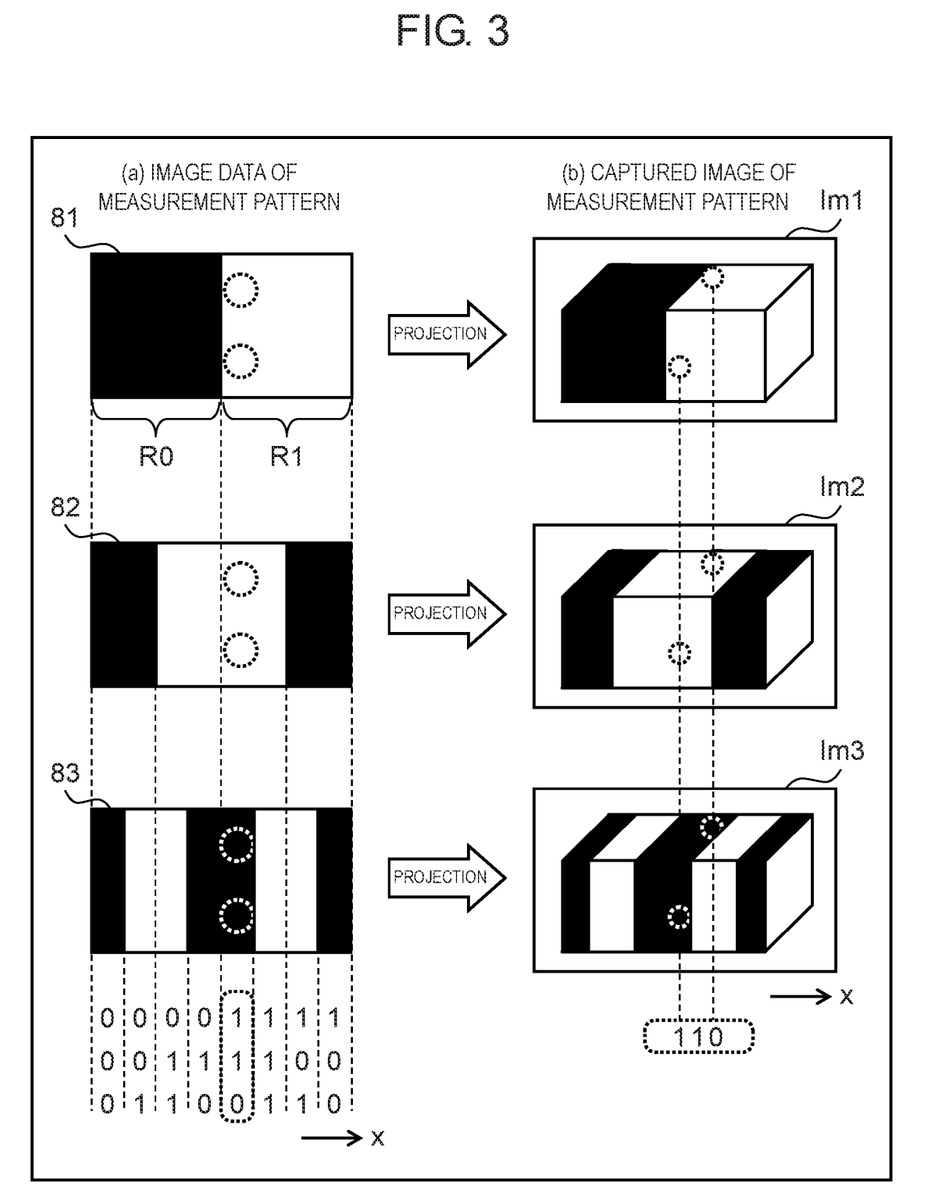
FIG. 3 is a diagram for explaining measurement patterns based on a spatial coding method.

In the present exemplary embodiment, as a measurement principle for measuring the shape and the like of subject 6, active stereo measurement by the spatial coding method is employed. The measurement principle will be described with reference to FIGS. 2 and 3. FIG. 2 is a diagram for explaining a principle of three-dimensional measurement. FIG. 3 is a diagram for explaining measurement patterns based on the spatial coding method.

In FIG. 2, camera 4 and infrared-light projector 3 are aligned such that optical axes thereof are parallel to each other. Hereinafter, a direction of each optical axis is assumed to be a z direction as illustrated in FIG. 2. Further, a direction that is orthogonal to the z direction and in which camera 4 and infrared-light projector 3 are aligned is assumed to be an x direction, and a direction orthogonal to the z direction and the x direction is assumed to be a y direction.

FIG. 2 illustrates a state where infrared light emitted from infrared-light projector 3 is reflected at a particular point (bright point) of an object and reflected light from the bright point is made incident on camera 4. As illustrated in FIG. 2, parallax θ is caused between camera 4 and infrared-light projector 3. When an image projected from infrared-light projector 3 is captured by camera 4, the projected image is displayed while being shifted by parallax θ in a captured image of camera 4. That is, as illustrated in FIG. 2, an x coordinate of the bright point in the captured image of camera 4 is shifted, according to a distance to the bright point on the object.

In projection system 1, based on a coordinate shift as described above, controller 5 (image generation unit 50) performs calculation based on triangulation in which an interval between camera 4 and infrared-light projector 3 is used as a base length to thereby measure the distance in the z direction. The base length is acquired in advance by calibration or the like at the time of installation of projection system 1, for example. A coordinate shift is measured using a measurement pattern based on the spatial coding method. This measurement method will be described with reference to parts (a), (b) of FIG. 3.

Part (a) of FIG. 3 illustrates, as an example, image data of a set of measurement patterns 81, 82, 83 projected from infrared-light projector 3. Each of measurement patterns 81 to 83 has emission region R1 and non-emission region R0 arranged along a direction of an x coordinate that is a shift measurement target. According to the spatial coding method, by allowing emission region R1 to correspond to "1" and allowing non-emission region R0 to correspond to "0", it is possible to code an x coordinate on the image data. In the example of part (a) of FIG. 3, from three measurement patterns 81 to 83, a 3-bit code corresponding to eight regions on the image data is obtained.

Part (b) of FIG. 3 shows captured images Im1, Im2, Im3 generated when an object (a rectangular parallelepiped in the example shown illustrated in FIG. 3) to which respective measurement patterns 81, 82, 83 in part (a) of FIG. 3 are projected is captured by camera 4. As illustrated in part (b) of FIG. 3, even in the case of a bright point corresponding a same code "110", an x coordinate in the captured image is shifted depending on a depth of the object. In the present exemplary embodiment, controller 5 measures a coordinate shift by decoding the imaged data showing captured images Im1 to Im3 in image generation unit 50.

Specifically, controller 5 first performs threshold determination by comparing brightness of a pixel with a predetermined threshold value, for each pixel of a captured image shown by imaged data of one frame. The predetermined threshold is a reference threshold for determining a pixel that shows the bright point of the emission region in the measurement pattern in the captured image. For example, the predetermined threshold is set in consideration of a light amount of noise. In the threshold determination, controller 5 assigns "1" to a pixel in which brightness is determined to exceed the threshold, and assigns "0" to a pixel in which brightness is determined not to exceed the threshold.

Controller 5 performs the aforementioned processing on all captured images Im1, Im2, Im3 and collects a binary value ("0" or "1") assigned to each pixel to thereby decode the imaged data. At that time, controller 5 may extract a region considered to be a subject on the imaged data, by eliminating a region in which brightness does not exceed the threshold in all captured images Im1 to Im3.

Controller 5 compares a value of an x coordinate indicated by a decoding result with a value of a reference x coordinate for each pixel to thereby measure a shift in the x coordinate. Also, for a shift in a y coordinate, measurement can be made similarly by using measurement patterns in which measurement patterns 81 to 83 in part (a) of FIG. 3 are turned by 90 degrees. Further, in a case where there is a parallax between infrared-light projector 3 and visible-light projector 2, information indicating installation positions of the two are acquired in advance for example, and three-dimensional coordinates defined in infrared-light projector 3 are converted into three-dimensional coordinates defined in visible-light projector 2, as appropriate.

2-3. Various Filters

Figure 4:
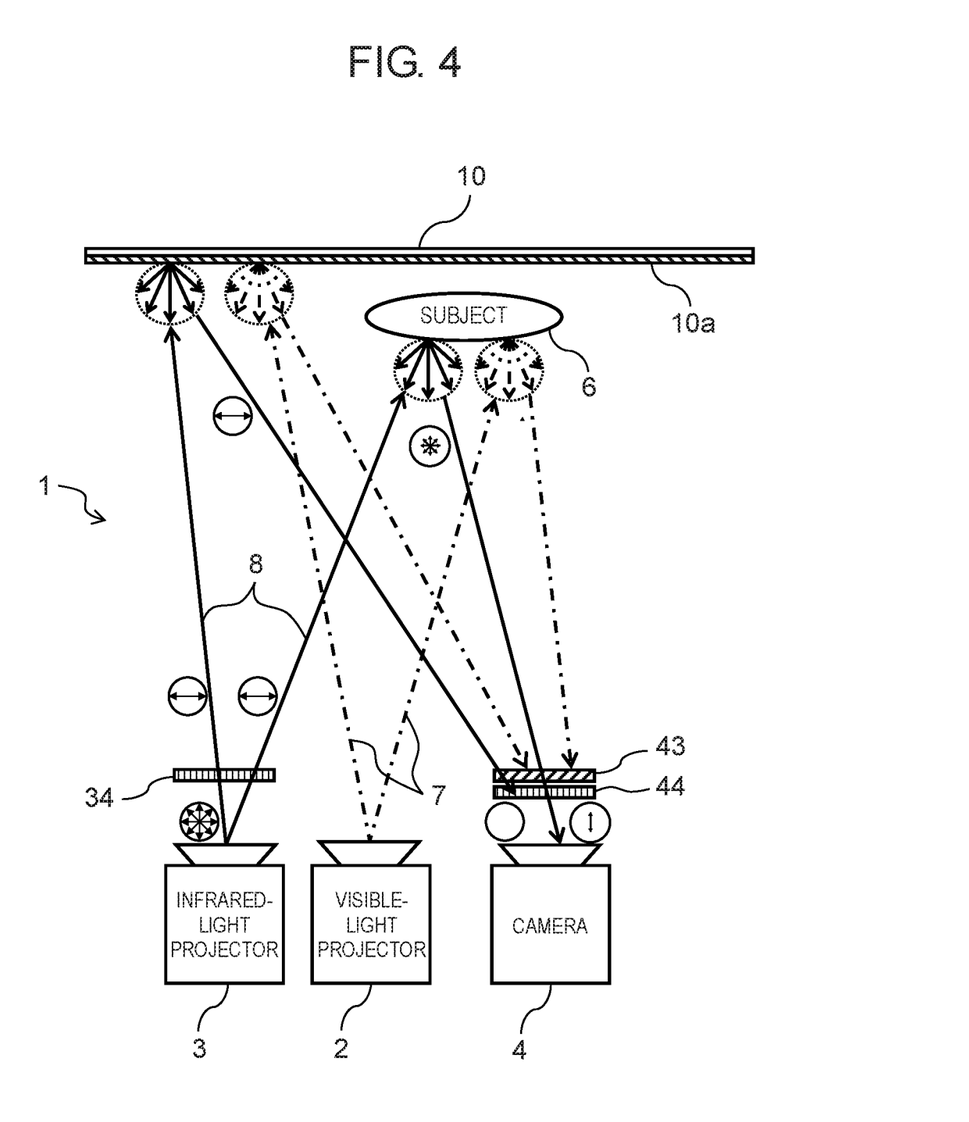
FIG. 4 is a diagram for explaining functions of various filters in the projection system according to the first exemplary embodiment.

Functions of first polarizing filter 34 and second polarizing filter 44 in the present exemplary embodiment will be described with reference to FIG. 4. FIG. 4 is a diagram for explaining functions of various types of filters in projection system 1.

In the present exemplary embodiment, visible-light projector 2 projects image content 71 onto subject 6 and screen 10 (see FIG. 1). In order to display image content 71 that is visible to a viewer or the like on screen 10, it is necessary that visible light 7 from visible-light projector 2 is diffused and reflected on screen 10, as illustrated in FIG. 4. However, when infrared light 8 from infrared-light projector 3 is diffused and reflected on both subject 6 and screen 10, in a captured image of a measurement pattern by camera 4, a boundary between a region of subject 6 and a region other than subject 6 becomes unclear.

Therefore, in order not to capture infrared light reflected at reflection surface 10a of screen 10 by camera 4, the present exemplary embodiment is configured to transmit only linearly polarized light component in a particular direction when infrared light 8 passes through first polarizing filter 34, maintain the linearly polarized light component in the particular direction when infrared light 8 is reflected at screen 10, and block only the linearly polarized light component in the particular direction when infrared light 8 passes through second polarizing filter 44. Thereby, a portion projected on screen 10 of the measurement pattern projected from infrared-light projector 3 is not displayed in the captured image of camera 4, and only a portion projected on subject 6 of the measurement pattern is displayed in the captured image. Therefore, the contour of subject 6 is clear on the captured image of camera 4, whereby the shape and the position of subject 6 can be measured with high accuracy.

For example, as illustrated in FIG. 4, infrared light 8 emitted at pulse light source 31 of infrared-light projector 3 is non-polarized light (arrows in all directions). Then, when infrared light 8 passes through first polarizing filter 34, only polarized light component in a horizontal direction is transmitted (an arrow in horizontal direction). Infrared light 8 that passed through first polarizing filter 34 is reflected at subject 6 or screen 10. Infrared light 8 reflected at screen 10 maintains a polarized state on reflection surface 10a of screen 10. Therefore, infrared light 8 is reflected only with horizontally polarized component (an arrow in horizontal direction). Then, horizontally polarized component is blocked at second polarizing filter 44, and the infrared light is not made incident on imaging device 41 substantially (no arrow). Therefore, the infrared light reflected at screen 10 is not captured by camera 4. Further, infrared light 8 reflected at subject 6 is diffused and reflected at a surface of subject 6. Therefore, infrared light 8 becomes non-polarized light (arrows in all directions). Then, while horizontally polarized light component is blocked by second polarizing filter 44, vertically polarized light component passes through this filter. Therefore, the infrared light reflected at subject 6 is captured by camera 4.

In the example of FIG. 4, infrared light 8 that passed through first polarizing filter 34 is horizontally polarized light. The infrared light reflected at screen 10 is horizontally polarized light. Then, second polarizing filter 44 is installed so as not to transmit horizontally polarized light. That is, this example is installed so as to transmit vertically polarized light. Further, in the infrared light diffused and reflected at subject 6, polarized light component of incident light is not kept, whereby the infrared light becomes non-polarized light. Then, the infrared light that passed through second polarizing filter 44 installed so as to transmit vertically polarized light becomes to have a light amount that is a half of an amount of infrared light of non-polarized light that is diffused and reflected at subject 6. Thereby, the infrared light reflected at screen 10 does not reach imaging device 41 of camera 4, but a light amount that is a half of the amount of infrared light 8 reflected at subject 6 reaches imaging device 41 of camera 4. Thereby, since contrast of an image to be captured by camera 4 clearly differs between screen 10 and subject 6, the contour of subject 6 can be clear.

Further, it is technically difficult that first polarizing filter 34 makes infrared light 8 have only horizontally polarized light component. However, in order to distinguish reflection at screen 10 from reflection at subject 6 by imaging device 41, it is only necessary that there is a difference in the light amount of infrared light that passes through second polarizing filter 44. In order to do so, a predetermined polarized state of infrared light 8 that passed through first polarizing filter 34 may be a state in which a rate of predetermined polarized light component in non-visible light is 50% or more. More preferably, in order to distinguish reflection at screen 10 from reflection at subject 6, it is only necessary that infrared light that passed through second polarizing filter 44 has a difference of 10% or more. That is, the predetermined polarized state of infrared light 8 that passed through first polarizing filter 34 may be a state where a rate of predetermined polarized light component in non-visible light is 60% or more.

Further, as screen 10, by using a screen on which metal powder such as a silver screen is applied all over reflection surface 10a, for example, visible light 7 can be diffused and reflected. Thereby, it is possible to secure visibility of an image by visible-light projector 2 on screen 10.

Further, in the present exemplary embodiment, visible light component of light made incident on camera 4 is blocked by using visible-light cutoff filter 43 in camera 4 to thereby transmit infrared light component, as illustrated in FIG. 4. Thereby, camera 4 can capture a measurement pattern by infrared-light projector 3 with high accuracy, regardless of timing of projecting an image with emission of visible light 7 by visible-light projector 2.

2-4. Pulse Emission Control

Figure 5:
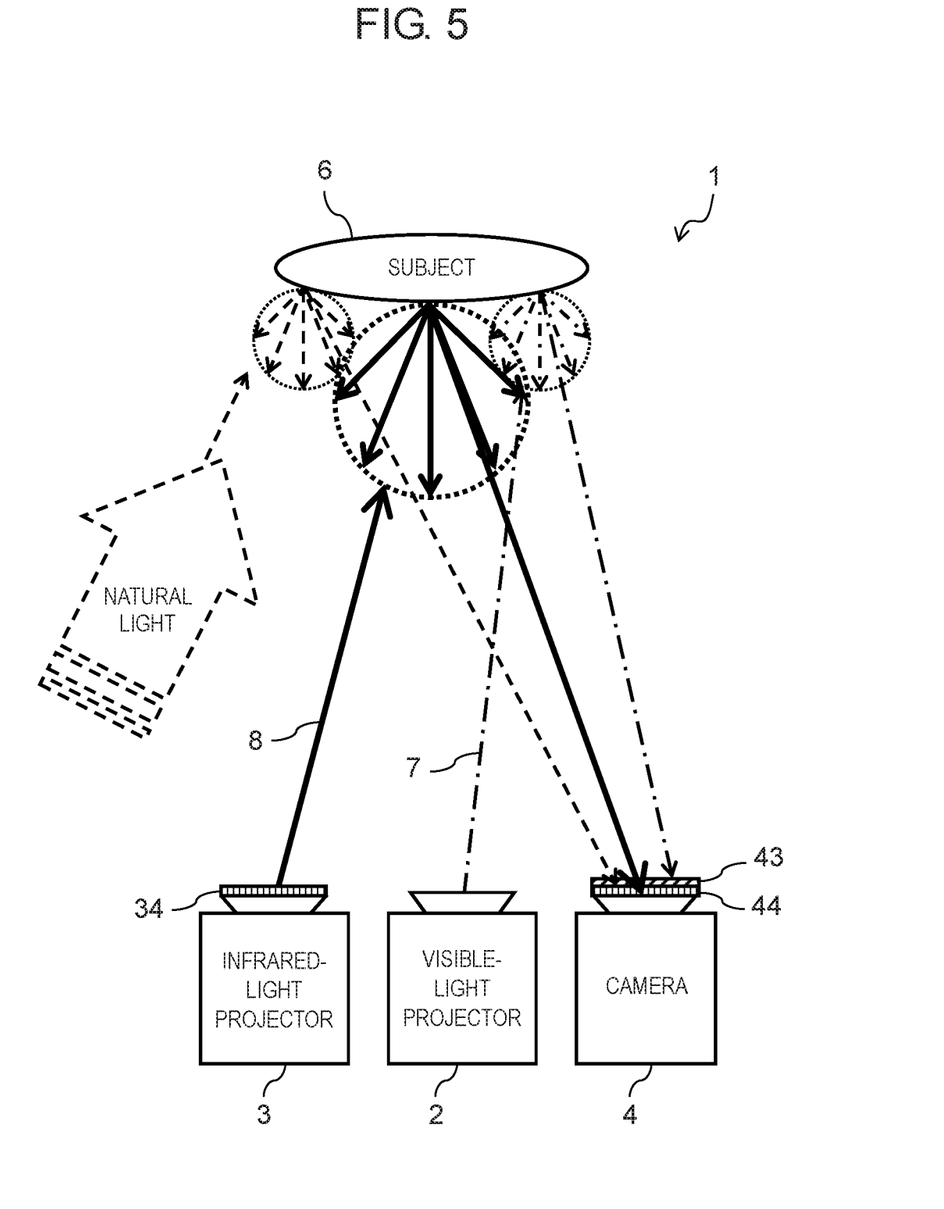
FIG. 5 is a diagram for explaining a function of pulse emission control in the projection system according to the first exemplary embodiment.

Pulse emission control of a measurement pattern in the present exemplary embodiment will be described with reference to FIG. 5. FIG. 5 is a diagram for explaining a function of pulse emission control in projection system 1.

As illustrated in FIG. 5, light reflected at subject 6 includes not only infrared light from infrared-light projector 3 but also visible light 7 from visible-light projector 2 and natural light. Natural light generally includes visible light component and also infrared light component. Here, when light other than infrared light from infrared-light projector 3 is exposed to camera 4, the light serves as noise that deteriorates measurement accuracy of subject 6 based on a captured image.

Therefore, in the present exemplary embodiment, pulse light source 31 (FIG. 1) of infrared-light projector 3 emits infrared light 8 for projecting a measurement pattern in a pulsed manner to allow a light amount of emitted infrared light 8 to concentrate in a period of a pulse width. At that time, camera 4 performs imaging operation in synchronization with timing of pulse emission of infrared light 8 to thereby increase the light amount of infrared light 8 at imaging timing of camera 4, compared with light amounts of the natural light and visible light 7 from visible-light projector 2, as illustrated in FIG. 5. Thereby, in the light amount exposed to camera 4, it is possible to remarkably increase the light amount of infrared light 8 from infrared-light projector 3 compared with the light amount of noise of the natural light and the like. Therefore, an S/N ratio in the measurement accuracy of subject 6 can be improved. Further, since influence of the natural light on the measurement accuracy is mitigated, a degree of freedom in installation of projection system 1 can be increased.

Hereinafter, details of the timing control of projection system 1 in the present exemplary embodiment will be described with reference to FIG. 6.

Figure 6:
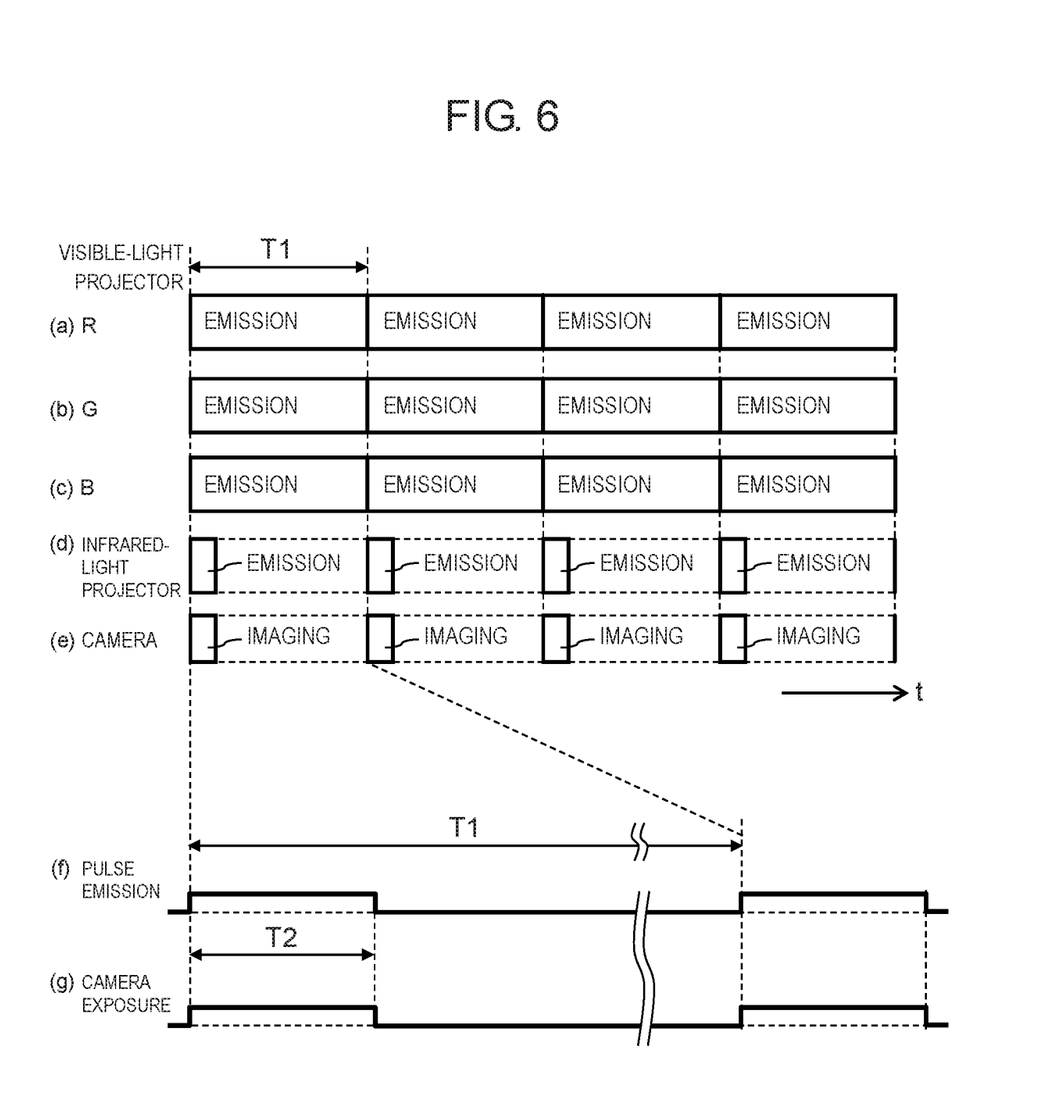
FIG. 6 is a timing chart illustrating operation timing of the projection system according to the first exemplary embodiment.

Parts (a), (b), and (c) of FIG. 6 illustrate emission timing of red light (R), green light (G), and blue light (B) by visible-light projector 2, respectively. In the present exemplary embodiment, as illustrated in parts (a) to (c) of FIG. 6, visible-light projector 2 drives visible-light source 21 (FIG. 1) so as to continuously emit red light, green light, and blue light in frame period T1 for projecting an image of one frame. Thereby, it is possible to set a light amount (maximum light amount) larger than a case of emitting red light, green light, and blue light in a time-division manner, for example, and an image to be projected can have higher quality. Frame period T1 is set to 1/200 seconds or less, for example, in order to allow an image to follow a moving body.

Part (d) of FIG. 6 illustrates emission timing of infrared light 8 by infrared-light projector 3. As illustrated in part (d) of FIG. 6, infrared-light projector 3 periodically performs pulse emission of infrared light 8 while superposing on a period in which visible-light projector 2 emits light. Thereby, compared with a case where visible light 7 and infrared light 8 are emitted in a time-division manner, it is possible to set respective light amounts of visible light 7 and infrared light 8 larger.

In the present exemplary embodiment, as an example, infrared-light projector 3 projects a measurement pattern of one frame per pulse emission. Further, a length of a pulse period that is a repetition period of pulse emission is set to the same length as frame period T1 of an image of visible light 7. Further, a light amount of infrared light 8 per pulse emission is set based on the light amount of visible light 7 that can be emitted by visible-light projector 2, for example. For example, the light amount is set to a light amount equal to or larger than the light amount of visible light 7 that can be emitted during frame period T1, or set to a light amount equal to or larger than visible light 7 that can be emitted during the same period as pulse width T2.

Part (e) of FIG. 6 illustrates imaging timing by camera 4. As illustrated in parts (d), (e) of FIG. 6, in the imaging operation, camera 4 performs exposure in synchronization with emission timing of infrared-light projector 3. Thereby, a captured image of camera 4 is obtained for each frame period T1. Parts (f), (g) of FIG. 6 illustrate details in frame period T1 of parts (d), (e) of FIG. 6, respectively.

As illustrated in parts (f), (g) of FIG. 6, in the present exemplary embodiment, camera 4 performs exposure at timing of pulse emission of measurement light and in the same period as pulse width T2. Pulse width T2 of pulse emission is set to a range from 0.1 picoseconds to 20 microseconds, for example. Thereby, it is possible to remarkably increase a peak of the light amount of pulse emission, while preventing a case where the pulse emission period is shortened too much so that a wavelength band of measurement light is widened. Further, from a similar viewpoint, a duty ratio of pulse emission is set to a range from 1/100 to 1/10000, for example. At that time, a pulse frequency corresponding to the pulse period may be set appropriately within a range from 200 Hz to 1 GHz, in order to secure a frame rate of a captured image that can follow a moving body.

3. Effects and Others

As described above, in the present exemplary embodiment, projection system 1 projects an image corresponding to a shape of an object such as subject 6. Projection system 1 includes infrared-light projector 3, camera 4, image generation unit 50, and visible-light projector 2. Infrared-light projector 3 emits infrared light 8 that is non-visible light having a predetermined polarized light property, and projects measurement patterns 81 to 83 by infrared light 8 onto an object and screen 10. Screen 10 is disposed behind the object in a direction that infrared light is emitted from infrared-light projector 3, and has reflection surface 10*a* having a property of reflecting incident infrared light 8 while maintaining the polarized light property. Camera 4 has second polarizing filter 44 disposed so as to block infrared light reflected by screen 10 while maintaining the predetermined polarized light property, and captures measurement patterns 81 to 83 projected by infrared-light projector 3. Image generation unit 50 measures a shape of an object based on an image captured by camera 4, and according to a measurement result, generates image data that shows an image to be projected onto the object. Visible-light projector 2 projects the image shown by the image data, onto the object with visible light 7.

According to projection system 1 described above, non-visible light reflected at screen 10 is blocked by second polarizing filter 44. Thereby, in projection system 1 in which an image corresponding to a shape of an object is projected, it is possible to measure the shape of the object such as subject 6 with high accuracy.

Further, in the present exemplary embodiment, screen 10 diffuses and reflects visible light 7. Thereby, visible-light projector 2 is able to display an image on screen 10, whereby stage effects in projection system 1 can be enhanced.

Further, in the present exemplary embodiment, camera 4 has imaging device 41 including silicon and a visible-light cutoff filter 43 that transmits infrared light and absorbs or reflects visible light. Thereby, in camera 4, even in a case where imaging device 41 has light receiving sensitivity to a visible light region, it is possible to block receiving of visible light. Therefore, accuracy of captured images of measurement patterns 81 to 83 of infrared light captured by camera 4 can be improved. Note that in a case of using an imaging device not having light receiving sensitivity to a visible light region, visible-light cutoff filter 43 may not be provided.

Further, in the present exemplary embodiment, visible-light cutoff filter 43 is a filter attached to imaging lens 42 in camera 4. Visible-light cutoff filter 43 may be a filter incorporated in imaging device 41, or may be integrally formed with imaging lens 42 in camera 4.

Further, in the present exemplary embodiment, infrared-light projector 3 has first polarizing filter 34 that gives predetermined polarized light property to infrared light 8 to be projected. First polarizing filter 34 is a filter attached to projection optical system 33 in infrared-light projector 3. First polarizing filter 34 may be integrally formed with projection optical system 33 in infrared-light projector 3. In a case where pulse light source 31 in infrared-light projector 3 is configured with a light emitter that emits light having polarized light property, first polarizing filter 34 may not be provided. Further, even in a case where the light emitter of pulse light source 31 emits light having polarized light property, by using first polarizing filter 34 together, infrared-light projector 3 can emit infrared light 8 in a polarized state that includes a larger amount of predetermined polarized light component that is main component.

Further, in the present exemplary embodiment, second polarizing filter 44 is a filter attached to imaging lens 42 in camera 4. Second polarizing filter 44 may be a filter incorporated in imaging device 41, or may be integrally formed with imaging lens 42 in camera 4.

Further, in the present exemplary embodiment, infrared-light projector 3 emits, in a pulsed manner, infrared light 8 for projecting measurement patterns 81, 82, 83. Image generation unit 50 generates image data based on captured images Im1, Im2, Im3 captured corresponding to timing of pulse emission.

According to projection system 1 described above, the light amount of infrared light for projecting respective measurement patterns 81, 82, 83 is concentrated in a period of a pulse width of pulse emission by infrared-light projector 3, whereby an S/N ratio in captured images Im1, Im2, Im3 can be improved. Thereby, in projection system 1, the shape of an object such as subject 6 can be measured with high accuracy.

Further, in the present exemplary embodiment, a pulse width of pulse emission by infrared-light projector 3 is shorter than a period of one frame of an image to be projected by visible-light projector 2. The light amount of pulse emission is larger than a light amount of visible light 7 emitted during the pulse width by visible-light projector 2.

Thereby, in the period of a pulse width, it is possible to set a light amount of pulse emission that is remarkably larger than the light amount of visible light 7 from visible-light projector 2. Accordingly, it is possible to improve measurement accuracy of an object in projection system 1.

Further, in the present exemplary embodiment, camera 4 performs an imaging operation in synchronization with pulse emission by infrared-light projector 3. Thereby, it is possible to obtain a captured image whose S/N ratio is improved by pulse emission, from camera 4.

Further, in the present exemplary embodiment, infrared-light projector 3 has pulse light source 31 configured with a pulse laser. Thereby, it is possible to perform pulse emission of a large light amount by pulse oscillation of the pulse laser.

Further, in the present exemplary embodiment, non-visible light images projected from infrared-light projector 3 are measurement patterns 81 to 83 based on a spatial coding method. Non-visible light images are not limited thereto. For example, a random dot pattern or the like may be used.

Further, the present exemplary embodiment has a configuration in which when infrared light 8 passes through first polarizing filter 34, only linearly polarized light component in a particular direction pass through, and when infrared light 8 passes through second polarizing filter 44, only the linearly polarized light component in the particular direction is blocked. However, in the present disclosure, the component is not limited to particular the linearly polarized light component. In the present disclosure, it is only necessary that non-visible light having a predetermined polarized light property, which is projected from infrared-light projector 3 and passes through first polarizing filter 34, is not detected by camera 4 via second polarizing filter 44. Therefore, it is also acceptable to have a configuration in which non-visible light is converted to have only non-visible light component in a predetermined polarized light state such as circularly polarized light or elliptically polarized light by first polarizing filter 34, and only the non-visible light component in the predetermined polarized light state is blocked by second polarizing filter 44.

Other Exemplary Embodiments

As described above, the first exemplary embodiment has been described as an example of the technique disclosed in the present application. However, the technique of the present disclosure is not limited to the first exemplary embodiment, and also applicable to other exemplary embodiments that undergo modifications, replacements, additions, and omissions, for example, as appropriate. A new exemplary embodiment can also be made by combining the respective component described in the aforementioned exemplary embodiment. Thus, other exemplary embodiments will be described as examples below.

In the aforementioned exemplary embodiment, description has been given on the example in which image content 71 is allowed to follow subject 6 in projection system 1. An object that is a projection target of the projection system according to the present disclosure is not particularly limited to a moving object but may be a stationary object, namely a building, for example. In a case where a stationary object is a projection target of the projection system, a position may not be measured during projection operation, particularly.

As described above, the exemplary embodiments have been described as examples of the technique of the present disclosure. For this purpose, the accompanying drawings and the detailed description have been provided.

Therefore, the components illustrated in the accompanying drawings and described in the detailed description may include components essential for solving the problems, as well as components that are not essential for solving the problems but required to exemplify the above techniques. For this reason, it should not be immediately deemed that those unessential components are essential just because those unessential components are described in the accompanying drawings and the detailed description.

Each exemplary embodiment described above is provided to exemplify the technique according to the present disclosure. Therefore, it is possible to make various changes, replacements, additions, omissions, and the like within the scope of the claims and equivalents thereof.

INDUSTRIAL APPLICABILITY

A projection system and a projection method according to the present disclosure are applicable to various applications of projecting an image on an object.

What is claimed is:

1. A projection system for projecting an image corresponding to a shape of an object, the system comprising:
   a non-visible light projection unit that projects a predetermined non-visible light image with non-visible light having predetermined polarized light as a main component, onto the object and a background member that reflects the non-visible light while the background member maintains the predetermined polarized light;
   an imager that images a non-visible light image reflected by the object and the background while blocking the non-visible light of the predetermined polarized light, and generates imaged data from the non-visible light image;
   an image generation unit that measures the shape of the object based on the imaged data, and generates image data according to a measurement result; and
   a visible-light projection unit that projects an image shown by the image data, onto the object with visible light.

2. The projection system according to claim 1, wherein the background member is a screen coated with metallic powder.

3. The projection system according to claim 1, wherein the background member is a silver screen.

4. The projection system according to claim 1, wherein the predetermined polarized light is any of linearly polarized light, circularly polarized light, and elliptically polarized light.

5. The projection system according to claim 1, wherein the non-visible light projection unit includes a first polarizing member that gives the predetermined polarized light to the non-visible light.

6. The projection system according to claim 5, wherein the first polarizing member is a polarizing filter.

7. The projection system according to claim 1, wherein the non-visible light projection unit includes a light emitter that emits the non-visible light of the predetermined polarized light.

8. The projection system according to claim 1, wherein the imager includes a second polarizing member that is disposed so as to block the non-visible light of the predetermined polarized light.

9. The projection system according to claim 8, wherein the second polarizing member is a polarizing filter.

10. The projection system according to claim 1, wherein the imager includes an imaging device including silicon, and a wavelength selection member that transmits the non-visible light and absorbs or reflects the visible light.

11. The projection system according to claim 10, wherein the wavelength selection member is a filter attached to an imaging lens in the imager or a filter incorporated in the imaging device.

12. The projection system according to claim 10, wherein the wavelength selection member is integrally formed with the imaging lens in the imager.

13. The projection system according to claim 1, wherein the non-visible light is infrared light.

14. The projection system according to claim 1, wherein the predetermined non-visible image is a measurement pattern based on a spatial coding method.

15. The projection system according to claim 1, wherein in the non-visible light, component of the predetermined polarized light is more than 50%.

16. The projection system according to claim 1, wherein in the non-visible light, component of the predetermined polarized light is 60% or more.

17. A projection method of projecting an image corresponding to a shape of an object, the method comprising:
   a non-visible light projection step of projecting a predetermined non-visible light image with non-visible light having predetermined polarized light as a main component, onto the object and a background member that reflects the non-visible light while the background member maintains the predetermined polarized light;
   an imaging step of imaging a non-visible light image reflected by the object and the background while blocking the non-visible light of the predetermined polarized light, and generating imaged data from the non-visible light image;
   an image generation step of measuring the shape of the object based on the imaged data, and generating image data according to a measurement result; and
   a visible-light projecting step of projecting an image shown by the image data, onto the object with visible light.

18. The projection method according to claim 17, wherein in the imaging step, a wavelength selection member transmits the non-visible light and absorbs or reflects the visible light, to capture the non-visible light image reflected by the object and the background member and to generate the imaged data.

* * * * *